US009139475B2

United States Patent
Konczak

(10) Patent No.: US 9,139,475 B2
(45) Date of Patent: Sep. 22, 2015

(54) GROUT FOR FILLING A MICRO-TRENCH

(76) Inventor: Jeffrey J. Konczak, Alpena, MI (US)

( * ) Notice: Subject to any disclaimer, the term of this patent is extended or adjusted under 35 U.S.C. 154(b) by 0 days.

(21) Appl. No.: 13/445,633

(22) Filed: Apr. 12, 2012

(65) Prior Publication Data

US 2012/0195694 A1    Aug. 2, 2012

Related U.S. Application Data

(63) Continuation of application No. 12/885,101, filed on Sep. 17, 2010, now abandoned, and a continuation of application No. 12/235,599, filed on Sep. 22, 2008, now abandoned.

(60) Provisional application No. 61/376,718, filed on Aug. 25, 2010.

(51) Int. Cl.

| E03B 7/10 | (2006.01) |
|---|---|
| E03B 7/14 | (2006.01) |
| F16L 57/00 | (2006.01) |
| F16L 59/00 | (2006.01) |
| C04B 14/00 | (2006.01) |
| C04B 18/06 | (2006.01) |
| C04B 28/02 | (2006.01) |
| C04B 111/00 | (2006.01) |
| C04B 111/70 | (2006.01) |

(52) U.S. Cl.
CPC ....... *C04B 28/021* (2013.01); *C04B 2111/0075* (2013.01); *C04B 2111/00724* (2013.01); *C04B 2111/70* (2013.01)

(58) Field of Classification Search
CPC .................................................. C04B 2111/70
USPC .................................. 106/705, 707; 405/157
See application file for complete search history.

(56) References Cited

U.S. PATENT DOCUMENTS

| 5,352,288 A | * | 10/1994 | Mallow | 106/605 |
|---|---|---|---|---|
| 5,454,866 A | * | 10/1995 | Gilbert et al. | 106/695 |
| 5,873,936 A | * | 2/1999 | Ogden | 106/715 |
| 2005/0191133 A1 | * | 9/2005 | Purcell | 405/157 |
| 2007/0056475 A1 | * | 3/2007 | Roddy et al. | 106/707 |

FOREIGN PATENT DOCUMENTS

EP    0847967 A1 * 11/2001

OTHER PUBLICATIONS

"Class F Fly Ash". Boral Fly Ash. Aug. 2003 [Retrieved on Sep. 11, 2012]. Retrieved from http://web.archive.org/web/20050516225550/http://boralmti.com/ProductSheets/Boral_Class_F_Fly_Ash.pdf.*
Calcium Lignosulfonate. Material Safety Data Sheet.*
Tyler, Edward J. "2005 National Electrical Estimator". Oct. 2004 [Retrieved on Sep. 11, 2011]. Craftsman Book Company. Retrieved from: https://goo.gl/RNCVaj.*

* cited by examiner

*Primary Examiner* — Kaj K Olsen
*Assistant Examiner* — Karam Hijji
(74) *Attorney, Agent, or Firm* — Dickinson Wright PLLC

(57) ABSTRACT

A grout for filing a micro-trench formed in the ground includes comprises Class F fly ash in a range of approximately 0 to 30% by weight of grout and cement kiln dust in a range of approximately 50 to 90% by weight of grout.

4 Claims, 3 Drawing Sheets

GROUT FOR FILLING A MICRO-TRENCH

CROSS-REFERENCE TO RELATED APPLICATIONS

This is a continuation application which claims priority to U.S. patent application Ser. No. 12/885,101, filed Sep. 17, 2010, entitled "Grout For Filling A Micro-Trench" in the name of Jeffrey Konczak which claims the benefit of and priority to U.S. Provisional Patent Application Ser. No. 61/376,718, filed Aug. 25, 2010, entitled "Grout for Filling a Micro-trench." This continuation application also claims priority to U.S. patent application Ser. No. 12/235,599, filed Sep. 22, 2008, entitled "Geothermal Grout, and Method of Preparing and Utilizing Same", in the name of Jeffrey Konczak. The entire contents of the applications referenced above are hereby incorporated by reference, as though set forth fully herein.

TECHNICAL FIELD

The present invention relates generally to the field of grout compositions. More specifically, the present invention relates to cementitious grout compositions for use in filling a hole or trench in the ground.

BACKGROUND ART

Cementitious grout compositions are generally known. The term "cementitious", as used herein, means a material which comprises hydraulic cement, that is, a calcium alumino-silicate, which when mixed with liquid water, will set to form a hard resultant product. The most common type of such cementitious material is known as "Portland cement" and, for the purposes of this disclosure, is what is meant by the term "cementitious material". While Portland cement materials are most common, other materials such as a relatively high-alumina cement material, a granulated blast furnace slag cement and slag/Portland cement blends are also know. Additionally, it is known that cementitious materials may contain other materials, which are not in themselves cementitious, but which can make a contribution to the setting of the final product. Examples of these added materials are the various natural and artificial pozzolans.

The need for grout in micro-trench applications is also known. Micro-trenching is a process where a trench is cut in the ground, typically using a trenching machine that is capable of cutting through cement, asphalt, earth, etc. Such micro-trenches are useful in embedding cables, conduits, pipes and other articles in the ground such as when running new fiber optic cables in an existing infrastructure. The term "micro-trench" generally refers to the fact that the trench created in the ground has a depth of greater than a few inches and also has at least some width. Once a micro-trench has been created, it is possible to insert a conduit, such as a plastic sleeve created continuously or having coupled sections running a given length, into the micro-trench. Generally, once the micro-trench is created and the conduit put in place, a grout material can be used to fill the micro-trench partially or completely to fill the hole and secure the conduit.

As a grout material, Portland cement-blended grout products have disadvantages with respect to filing a micro-trench as the produced fluids have a relatively high water to cement ratio mixtures. This results in relatively significant shrinkage amounts due to the high temperature calcium-monoxide CaO and calcium-carbon monoxide CaCO reactions. This shrinkage leads to relatively significant surface defects and to a relatively high amount of consolidation both of which are too significant for success as a micro-trench grout application. While the strength performance could be improved, the relatively high heat of hydration causes difficult workability in the field particularly in summer-time temperatures (above 80 degrees Fahrenheit). Additionally, the Portland-based cement-blended grout products are typically not sufficiently liquid enough (thin or fluid), which leads to bridging of the material across the trench and/or around any structures placed in the micro-trench thereby causing poor hydration and poor set properties due to voids and other imperfections in the cured grout. This is particularly a concern when hydration temperatures are relatively high, above 100 degrees Fahrenheit. Accordingly, overall poor consolidation and other issues with Portland cement-based grout products are too significant to consider it a viable option in a micro-trench application.

Other cementitious grout materials are similarly insufficient. An exemplary cementitious grout material is disclosed in U.S. Pat. No. 5,536,610, the entire contents of which are incorporated herein by reference, and as shown, the cementitious grout includes a fly ash material. The term "fly ash" is defined in Standard Specification C 618 of the American Society for Testing and Materials (ASTM) as a "finely divided residue that results from the combustion of ground or powdered coal". ASTM C 618 (the contents of which are incorporated herein by reference) defines two distinct types of fly ash, Class F and Class C. Class F is obtained from the combustion of anthracite or bituminous coal and is being more common than the Class C, which is obtained from the combustion of sub-bituminous coal or lignite. One characterizing feature of Class C fly ash is its higher calcium-containing material content, expressed as lime content, and as stated by ASTM C 618 as often "higher than 10%". The use of fly ash in cementitious grout compositions confers useful properties such as enhanced final strength and durability and reduced permeability. However, fly ash also confers low early strength, which is disadvantageous in many applications, and also retards the set time.

A mixture of bentonite clay and water has also been used to create a grout mixture for use in a bore hole or other ground application. Bentonite is an adsorbent, generally made from impure clay which was formed from volcanic ash that has weathered. The component make up of bentonite varies widely depending upon the geographic region and the constituent parts that make up the particular bentonite material as is known. Accordingly, there are several primary different types of bentonite. The names of the types of bentonite typically depend on the dominant element of the bentonite, such as potassium (K), sodium (Na), calcium (Ca), and aluminum (Al).

However, it is also generally known that bentonite/water grout mixtures lead to a resultant product having low strength gain during the setting process and 60-70% by volume loss of fluid due to shrinkage. Because bentonite material does not hydrate, bentonite minerals settle out of the fluid rapidly leaving large volumes of bleed water on the surface of the grout composition when located in a hole or trench. Due to significant consolidation of bentonite grout mixtures, if a level finished ground is desired, then the amount of back fill necessary to fill the hole greatly increases. For example, in a micro-trench application, the addition of an asphaltic sealer on top of the set bentonite/water mixture is generally known. However, the greater the consolidation of the grout material, the greater the amount of asphaltic sealer needed to obtain a flat finished surface, which is a requirement for pavement applications. Also, if the asphaltic sealer (generally applied at a relatively high temperature) is applied too quickly after setting of the bentonite grout mixture, it will result in the boiling of water which collects on top of the bentonite-based grout and leads to the complete dehydration of the bentonite/water mixtures ultimately leading to complete failure of the grout. Accordingly, bentonite/water mixtures are not considered a viable option for use in micro-trench applications.

While it is also known to use a graphite-based grout blended with water, this solution has proven not a viable option for micro-trenching due to the blends shrinkage and consolidation. Graphite-based grout blended with water compositions also demonstrate significant bridging of the material when used in a micro-trench application as it does not flow effectively into the micro-trench. Finally, the cost of graphite-based grout blended with water is also a major drawback. The graphite-based grout bagged material is estimated to cost up to ninety dollars (US $90) per fifty pound (50#) bag. It is anticipated that at this cost level, the product would likely meet with nearly no significant market acceptance.

In another example similar to the above mixtures, it is also known to use four (4) bags of silica sand added to one (1) bag of bentonite clay for addition with a water reducing admixture added to one (1) bag of a Portland cement to also prepare a cementitious grout mixture. This mixture is known for use as a geothermal grout in a bore hole in the ground. This mixture is not suitable for micro-trench applications.

Thus, given the relatively high ratio of the micro-trench and the potential applications, such as in roadways where there is a great deal of load requirements, to date, no acceptable grout has been developed that will adequately perform for this application. In particular, known grout mixtures are difficult to maintain flowability while placing, and have significant drawbacks when attempting to pump through drilling contractors on-board mud pumps. While some of these concerns might be addressed through the use of additional pump equipment for placement of the mixed grout, the micro-trench and conduit remain subject to bridging. It is known that some laborers are accustomed to adding extra water to grout compositions in an effort to make the grout mixture flow better. However, the extra water damages the grout composition and its ability to properly cure leading to significantly poor and unacceptable performance of the installed system. For a bentonite grout, the greater the added water for flowability, the higher level of shrinkage and cracking that will occur. These cracks and fissures create air gaps along surfaces of the grout and its interface with the conduit allowing ground water to flow into and fill the voids and further degrade the performance.

SUMMARY OF THE INVENTION

It is therefore an advantage of the present invention to provide a functioning grout material that can properly function in a micro-trench applications.

It is another advantage of the present invention to provide a micro-trench grout material that resists shrinkage and cracking during hydration as compared to current grout products.

It is a further advantage of the present invention to provide a micro-trench grout material that has a significantly decreased cost over other grout materials.

It is still another advantage of the present invention to provide a micro-trench grout product that eliminates the requirement for multiple components that need to be mixed on site.

It is yet another advantage of the present invention to provide a micro-trench grout product that decreases the complication and cost for users/installers to inventory, haul and deliver such material to the use site (i.e., trench or bore-hole).

In accordance with the above and the other advantages of the present invention, a grout for filing a micro-trench is provided. The micro-trench is formed in the ground to form a ground hole. A conduit for receipt of a structure is inserted into the ground hole. The grout is then backfilled into the hole. The grout comprises Class F fly ash in a range of approximately 0 to 30% by weight of grout and cement kiln dust in a range of approximately 50 to 90% by weight of grout.

These and other features and advantages of this invention will become more apparent to those skilled in the art from the detailed description of a preferred embodiment. The drawings that accompany the detailed description are described below.

DETAILED DESCRIPTION OF THE PREFERRED EMBODIMENT

Figure 1:
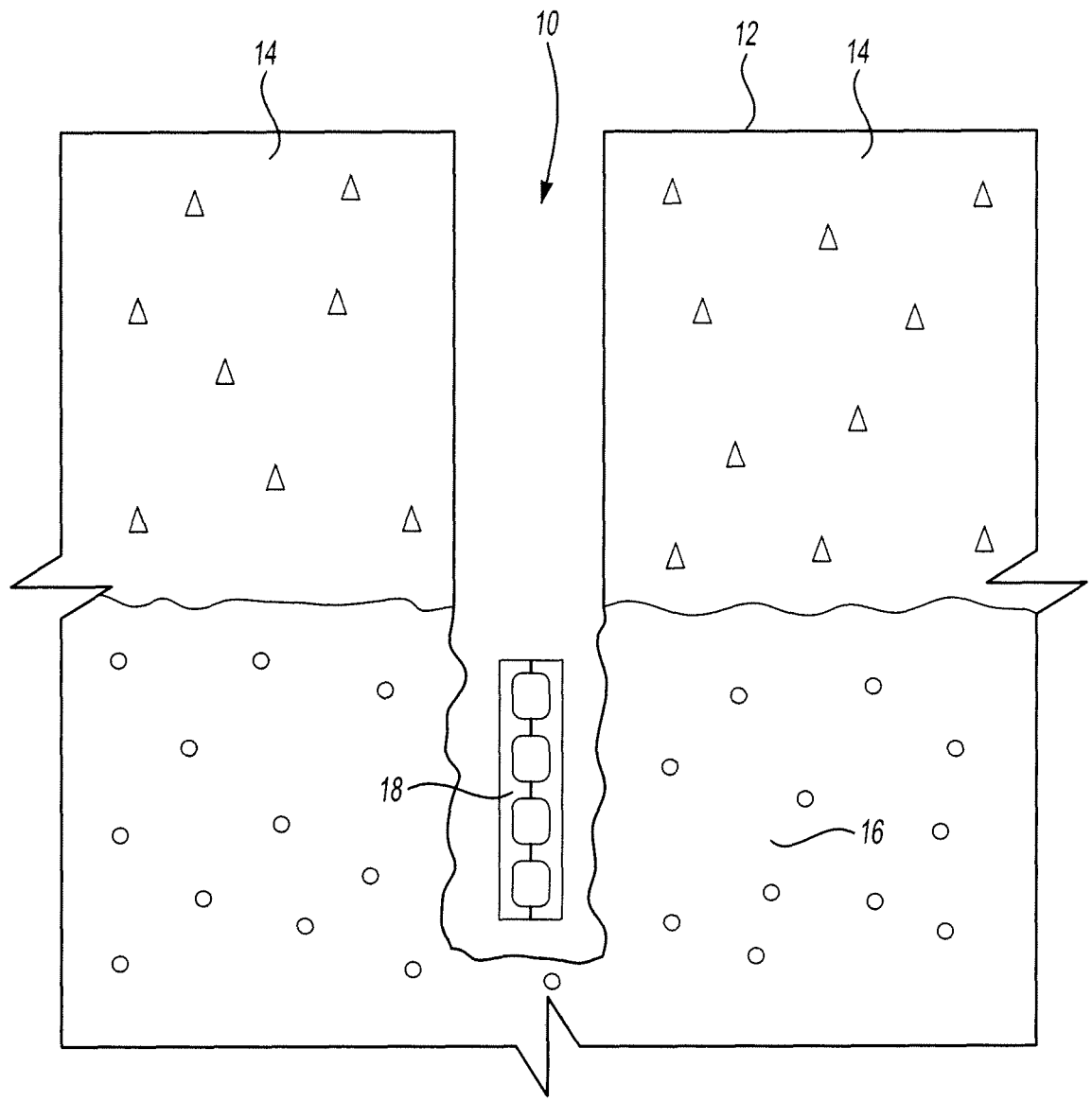
FIG. 1 is a partial cross-sectional view of a micro-trench having a conduit located therein.

The present disclosure provides an exemplary embodiment of a micro-trench grout mixture with a formulation having various constituents to ensure the performance of the grout material. Factors such as set time, fluidity, consolidation and stability make these formulations unique in nature and the balancing of product ingredient interaction can dramatically affect the performance of each factor. Additionally, the complete consolidation and non-porosity of the product while fluid flowing into the mechanical separations of a two-piece micro-duct, when upon hardened, gives the ability to pull a complete vacuum, which provides unique product characteristics.

The phrase "single component grout" material is intended to refer to a cementitious grout material in a single bag that can be mixed with water to make a prepared cementitious grout material that can be used in a micro-trench application to prepare a finished grout.

Micro-trenching is an emerging market that is being developed for various industries, including telecom and fiber installation. It will be understood that micro-trenching can be utilized for other applications and in other industries. As set forth above, micro-trenching is a process where a trench is cut into the ground, such as with a trenching machine that is capable of cutting through cement, asphalt, earth, etc. Once a micro-trench is formed, cables, conduits, pipes, and/or other articles can be placed into the ground. Micro-trenches are often formed in roads, streets, sidewalks and other thoroughfares. Companies have developed micro-trench cutting and installation equipment to increase the speed of installation of communications, power, fiber optic and other cables, including Quanta Services from Houston, Tex. and Ditch Witch of Perry, Okla. A micro-trench is generally characterized by an opening in the ground that has a depth of more than a few inches and also some width. Generally, in micro-trenching, the surface and ground material are at least partially removed to create a trench having a depth of about twelve inches or greater and a width of about one-half of an inch or greater. Such a micro-trench generally has a depth to width profile of greater than about 6. In one application, the depth is about twelve inches and the width is about three-quarters of inch so the micro-trench has a ratio of about eighteen (18). However, in certain applications the trench may be increased in depth to accommodate local requirements. It will be understood, however, that a micro-trench could also be formed despite the absence of removal of the ground material.

Once a micro-trench has been created, a conduit, such as a plastic sleeve created continuously or having coupled sections running a given length can then be inserted. It is desirable to have a grout material fill at least a portion of the micro-trench. Generally, once the micro-trench is created and the conduit put in place, a grout material can be used to fill the micro-trench partially or completely around the conduit.

In accordance with one embodiment, once the trench is cut and vacuumed, a snap-together continuous cable duct that measures about ⅜" wide by about a 3 to 4" in depth is laid into the trench. Compared to other technologies, the ability to continuously cut the micro-trench allows for significant increased productivity. Once the micro-trench is cut, the cable duct put in place, the trench is back-filled with a grout material. Thereafter, an asphaltic sealer is placed on top of the back-filled grout material, as discussed in more detail below. At a later time, the cables or fiber optics can be pulled or vacuumed into the duct if it is securely stable and sealed. This is possible because the hardened grout minimizes air communication with the duct. With prior grouts that do not have this consolidation, the cables or filter optics would need to be fished in. From the surface, the roadway appears to have only a control joint running along the trenched surface.

The significance of micro-trenching includes eliminating broad-scale street removal or tear-ups, to eliminating directional boring cost and easement acquisition and related delay costs associated with prior technologies. A benefit of micro-trenching is that the micro-trench can be cut in a single day and fiber can be installed the following day. This requires little, if any road closures or traffic disruptions.

The grout composition for use in connection with a micro-trench application is discussed below. It will be understood, however, that the disclosed grout composition may be utilized in many other applications besides micro-trenching, including those having similar characteristics. The grout composition provides superior void filling properties and is mixable, such as in a single component grout, with water to make a grout fluid that will freely flow and will then consolidate in the micro-trench. The grout fluid hardens relatively quickly in-place and around ducts and conduit tracts (or other objects) located the micro-trench. In accordance with a preferred embodiment, the micro-trench grout is made up from a blend of component ingredients including between about zero (0%) and about thirty percent (30%) Class "F" fly ash and about fifty (50%) to about ninety percent (90%) Cement Kiln Dust (CKD). The fly ash and CKD raw materials are pre-blended into a single component grout material and can be used in any appropriate way, but are usually put in bags for shipping to a work site. The single component grout bags are in one exemplary embodiment a seventy pound (70 lb.) bag of the grout mixture. The single component grout mixture bag is to be mixed with water to provide a grout fluid that will hydrate relatively quickly and yet provide a superior quality consolidated grout product such that there are nearly no significant voids in the consolidated grout such that a sufficient vacuum can be pulled on the two-piece conduit (so to install optic fiber cables therein). In the exemplary embodiment, five (5) gallons of water is mixed with the seventy pound (70 lb.) grout mixture from the bag. When five gallons of water is added, the yield of grout fluid is then about seven (7) gallons. It will be understood that the single component grout can be combined in large or smaller bags.

In accordance with another embodiment, in another exemplary embodiment, two other dry chemical components are added to the Class F fly ash and the CKD, discussed above, to formulate a grout fluid mixture. These additional dry chemical components aid in the performance of the micro-trench grout product. The first dry chemical component added is a mid-range water reducer which helps to enhance the flowability of the mixed grout fluid. The preferred mid-range water reducer materials are either naphthalene or a lignosulphonate, commonly known as a "lignin". It will be understood that other mid-range water reducers may also be utilized. The addition rate of the mid-range water reducer depends upon the particular physical characteristics of the fly ash component. The addition rate of the mid-range water reducer is preferably between about zero (0) to about twelve (12) fluid ounces equivalent per CWT (hundred-weight) of dry grout mixture.

The second dry chemical additive to the blended and bagged single component grout mixture product artificially hydrates the fly ash particles. The second dry chemical additive is preferably a caustic such as sodium hydroxide (NaOH). Class "F" fly ash has calcium oxide (CaO) under the hard, non-reactive layer of the silica (SiO2) of the fly ash. It has been found that the sodium hydroxide (NaOH) operates to perforate the shell of the fly ash particles, which opens up the calcium oxide (CaO) therein to hydration. When this occurs on a macro scale, the grout fluid will much more quickly and completely harden in place and provide a consolidated grout with excellent properties. The addition rate of the second dry "caustic" component is preferably between about zero (0) and nineteen (19) dry ounces per CWT (hundred-weight). It will be appreciated by one of ordinary skill in the art that other dry chemical additions may alternatively be employed. Also, the addition rate may vary.

Unlike other known grout compositions and their resulting grout materials, the micro-trench grout liquid composition hydrates and hardens within between about 5 to about 10 hours. This works to counteract the shrinkage due to absorption of surrounding soils or internal shrinkage as the stiffening helps secure the particles in place. Calcium silicate hydrate (CSH) consists of microscopic siliceous glass crystals that grow and surround all particles in the grout mixture matrix. The CSH crystals act to provide both strength and stiffness against shrinkage pressures from hydrating and consolidating cementitious grout mixture due to the fact that the particles are suspended by strengthening crystals. As long as there is moisture present and available, hydration of the grout continues into perpetuity and thereby continually reduces permeability of the consolidated grout as well as to more effectively protect the encased conduit cabling therein. Since the consolidated grout continues to hydrate, its strength (amount of force it can withstand as measured in pounds per square inch) will continue to increase.

Because the fly ash particles are primarily a silica material, the hydration product is a calcium silicate-based material. The Cement Kiln Dust (CKD) is composed of primarily a silica and other constitutes and the particle sizes of the CKD are so small and numerous that the gaps where the two-piece conduit or cable track snaps together is effectively blocked or sealed as the grout fluid mixture is consolidated or hardened. The micro-trench grout accordingly allows the contractor to apply a vacuum to one end of the conduit so that a fiber optic or other cable can be run/pulled/routed through the conduit a relatively very long distance and in a significantly more efficient manner than traditional "fish and pull" methods. Without a dense, air-impermeable micro-trench grout mixture as disclosed and used as the backfill grout in the micro-trench, there would be a significant loss of vacuum, which would result in higher costs to install any cabling.

While depending upon several factors including but not limited to the depth of the micro-trench, the depth and type of asphalt and any sub-base voids, and the details of the micro-duct/conduit configurations, the micro-trench grout in its liquid mix configuration (see FIG. 1b) is capable of filling between about 1.25 and 2.75 lineal feet of a twelve inch (12") deep micro-trench per fifty pound (50#) bag of micro-trench grout mix.

Figure 1A:
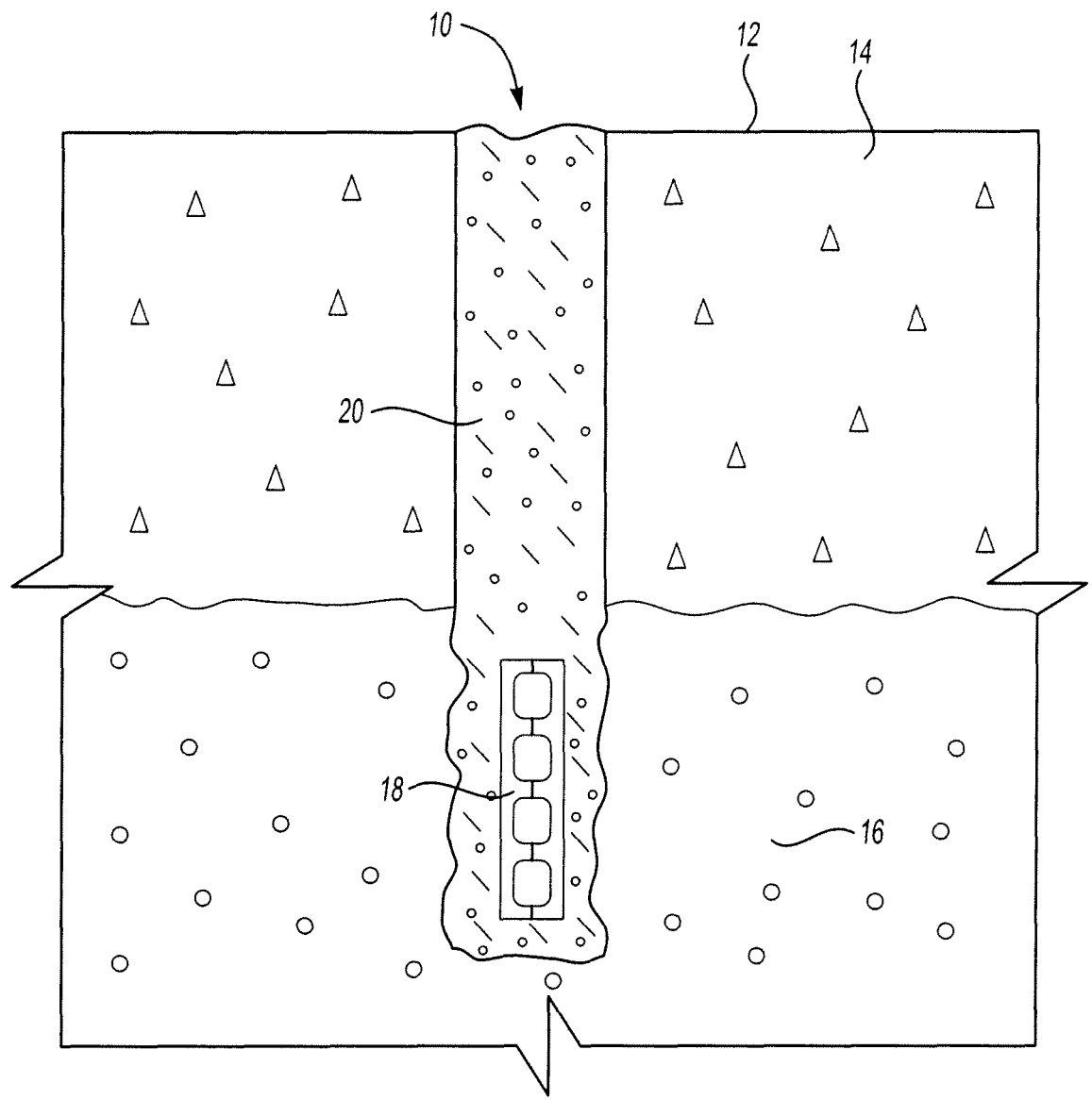
FIG. 1a is the partial cross-sectional view of the micro-trench of FIG. 1 having a conduit located therein and with the liquid phase grout filling the micro-trench.
Figure 1B:
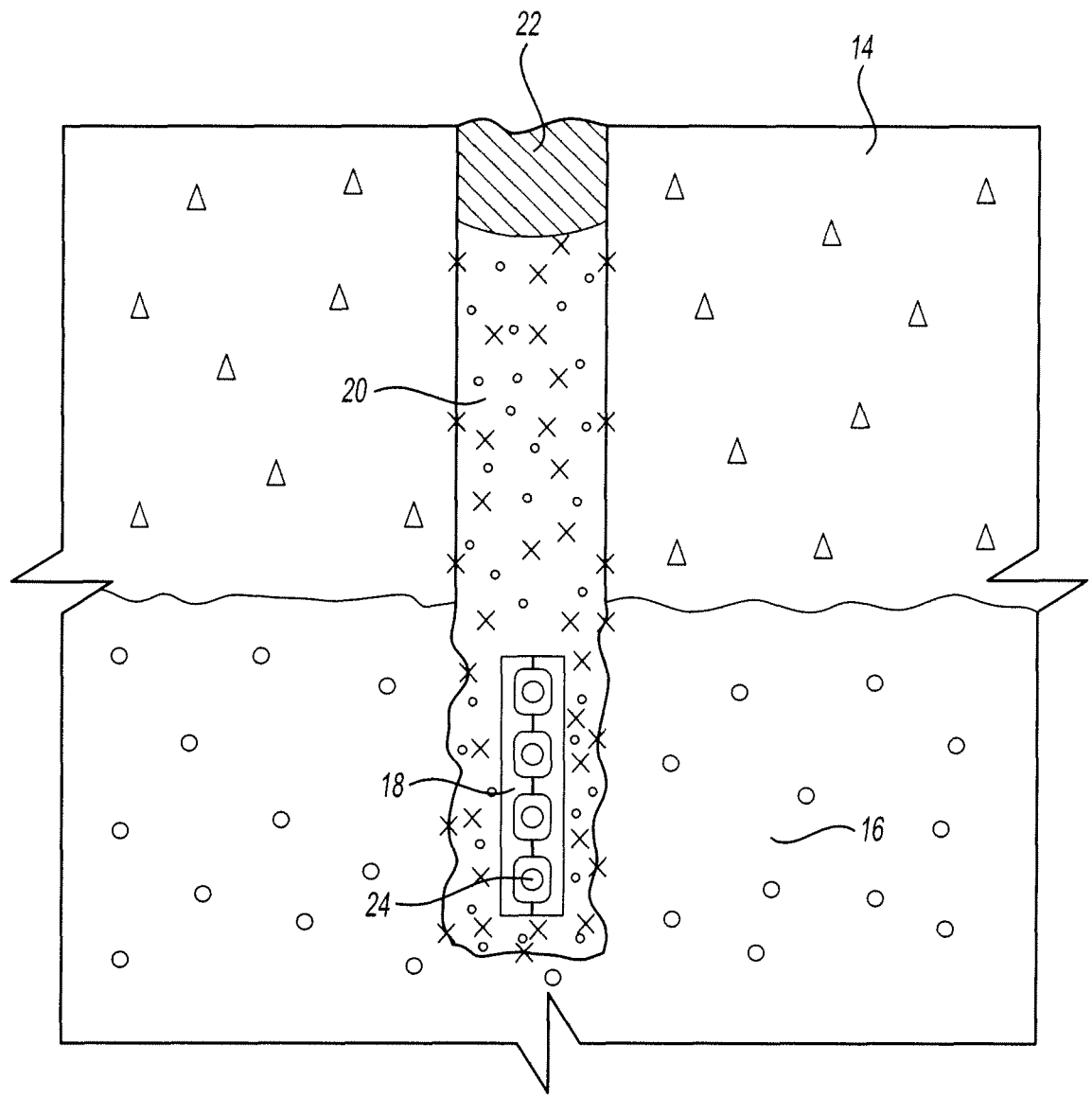
FIG. 1b is the partial cross-sectional view of the micro-trench of FIG. 1 having a conduit located therein and with the hydrated grout filling the micro-trench and an asphalt fill patch.

With reference to the FIG. 1, a micro-trench 10 is formed in the ground 12. As shown, the micro-trench is a relatively deep ground hole as compared to its width and is formed through an asphalt layer 14 and an aggregate sub base 16. As discussed above, the micro-trench 10 can be formed in a variety of surfaces, including roadways, etc. Once the micro-trench 10 is formed, a duct 18, such as a plastic duct for receipt of fiber optic cables is installed in the micro-trench (see FIG. 1). Once the installation of the duct 18 is complete, a grout liquid composition 20 is poured into the micro-trench 10 to fill and consolidate around the duct 18 to the top of the micro-trench surface (see FIG. 1a). The micro-trench grout liquid composition 20 is used as a fluid backfill material grout and is approximately similar to the consistency of chocolate milk.

The micro-trench grout liquid composition 20 begins to hydrate (harden) once it contacts the micro-trench soils 16. The liquidity (fluidity or consistency) of the micro-trench grout liquid composition 20 upon entry into the micro-trench is particularly beneficial. However, this benefit would not mean much if the micro-trench grout liquid composition 20 does not consolidate relatively quickly in the ground and properly around the micro-duct conduit 18. Traditionally, the more thin the grout composition, the lower the quality of the consolidation of the grout in the ground. This is not the case with the disclosed exemplary embodiment micro-trench grout mixture.

Due to the micro-trench grout mixture's relatively extremely fluid characteristics, once the micro-trench is filled, the consolidation of the grout column is such that the distance from the top of pavement to the top of the backfill is approximately ¾". In accordance with one embodiment, a sealer 22 is placed upon the hardened surface of the micro-trench grout mixture 20 at about 450 degrees F. If the grout column backfill material was still fluid the relatively high temperature of the sealer material (such as an asphalt) would boil off any free water causing a breakdown of the bond between the sealer and the grout column backfill. Once the sealer is cooled to ambient/surrounding temperature the integrity of the bond between the sealer and the consolidated grout column directly affects the long-term performance of the micro-trench system. (FIG. 1b) Because typically the asphaltic sealer is nearly about US $3.00 per lineal foot/depth inch and the micro-trench grout mixture is less than about one-tenth the cost per lineal foot/depth inch, consistent consolidation of the grout mixture column is critical to maintaining the appropriate sealer depth to maintain project material costs.

Additional benefits of the relatively high initial fluidity characteristics of the micro-trench grout material are its ability to flow into defective voids under pavements, in pavements and aggregate bases which when hardened solidifies to a state that repairs the defects. The resulting benefits of the use of the micro-trench grout mixture in micro-trench applications can dramatically improve long-term road section performance over allowing the defective voids to continue to exist.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical range provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or movable (e.g., removable or releasable). Such joining may be achieved with two members or the two members and any additional intermediate members being integrally formed as a single unitary body with one another or with the two members of the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the one-piece seat structure as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A method of installing at least one item below a ground surface, comprising:

cutting through a pavement disposed on the ground surface;

creating a microtrench such that it extends from the ground surface through at least a portion of an aggregate sub base below the ground surface, the microtrench defining a trench depth being approximately 12 inches and a trench width being approximately 0.75 inches;

inserting at least one conduit into said microtrench such that said conduit is disposed below the ground surface;

preparing a dry grout mixture including class F fly ash in a range of approximately 0 to 30% by weight of the dry grout mixture, cement kiln dust in a range of approximately 50 to 90% by weight of the dry grout, a mid-range water reducer in an amount of 0.1-8.0 fluid ounce equivalent per hundred-weight of the dry grout mixture, and a dry sodium hydroxide material in an amount of 0.2-19 dry ounces per hundred weight of the dry grout mixture;

mixing said dry grout mixture with a predetermined amount of water to provide a fluid grout mixture;

filling the microtrench with said fluid grout mixture to encapsulate and protect the at least one conduit;

allowing said fluid grout mixture to harden and consolidate into voids in said pavement, said aggregate sub base, and said conduit to provide structural stability to any defects in said pavement, said aggregate sub base, and said conduit;

allowing said fluid grout mixture to substantially remain in contact with said conduit and said walls upon hardening;

placing an asphaltic sealer on top of said hardened grout material to substantially match a level of said pavement; and vacuum pulling at least one fiber optic cable into said conduit after said grout material has been placed in said microtrench.

2. The method of claim 1, wherein said mid-range water reducer is naphthalene.

3. The method of claim 1, wherein said mid-range water reducer is lignosulphonate.

4. The method of claim 1, wherein said step of mixing said dry grout mixture with a predetermined amount of water includes mixing approximately five gallons of water per approximately 70 pounds of said dry grout mixture.

* * * * *